Jan. 11, 1927. 1,614,362
S. HARDY
LATH CUTTING MACHINE
Filed Oct. 5, 1923 3 Sheets-Sheet 2
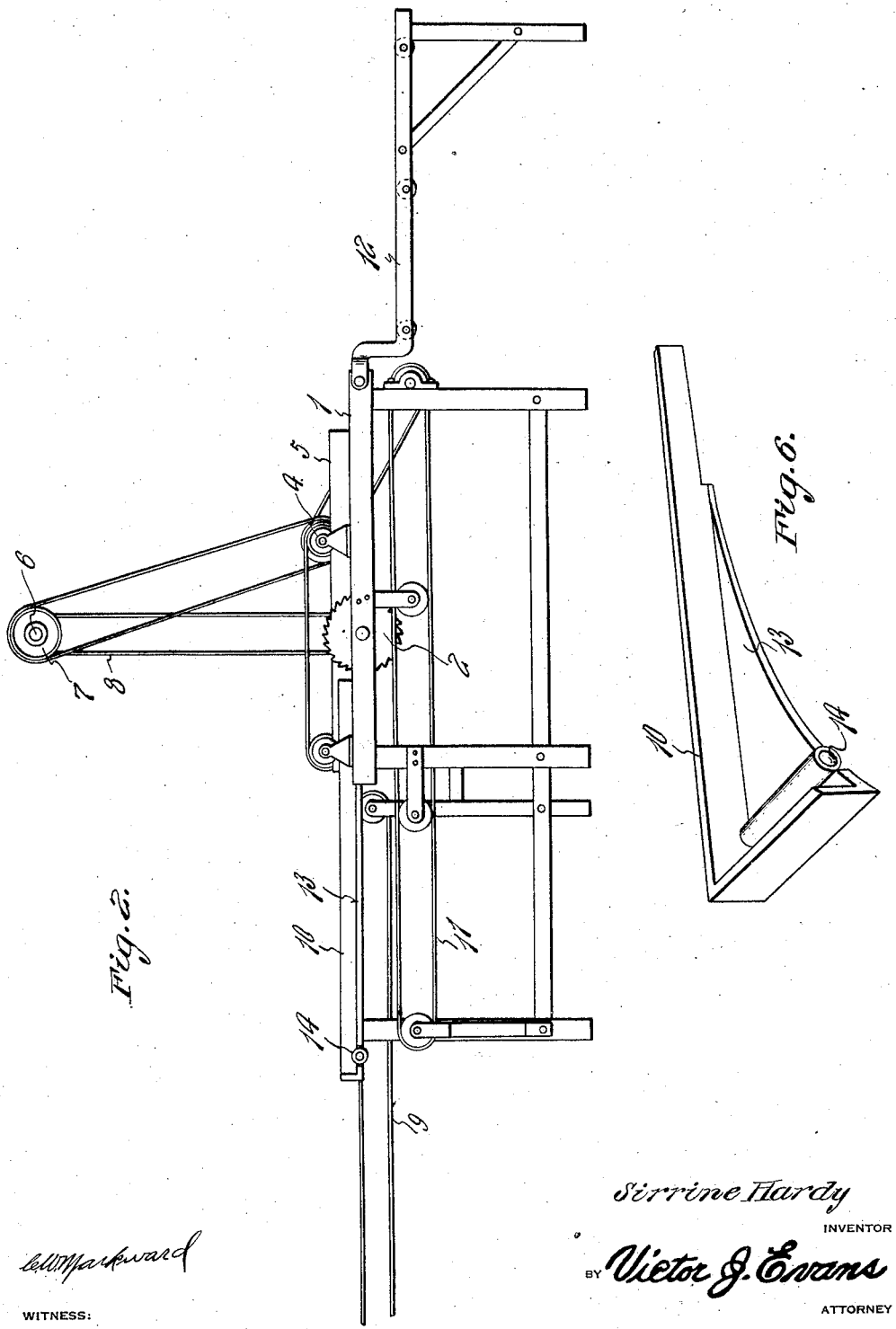
Sirrine Hardy
INVENTOR
BY Victor J. Evans
ATTORNEY
WITNESS:

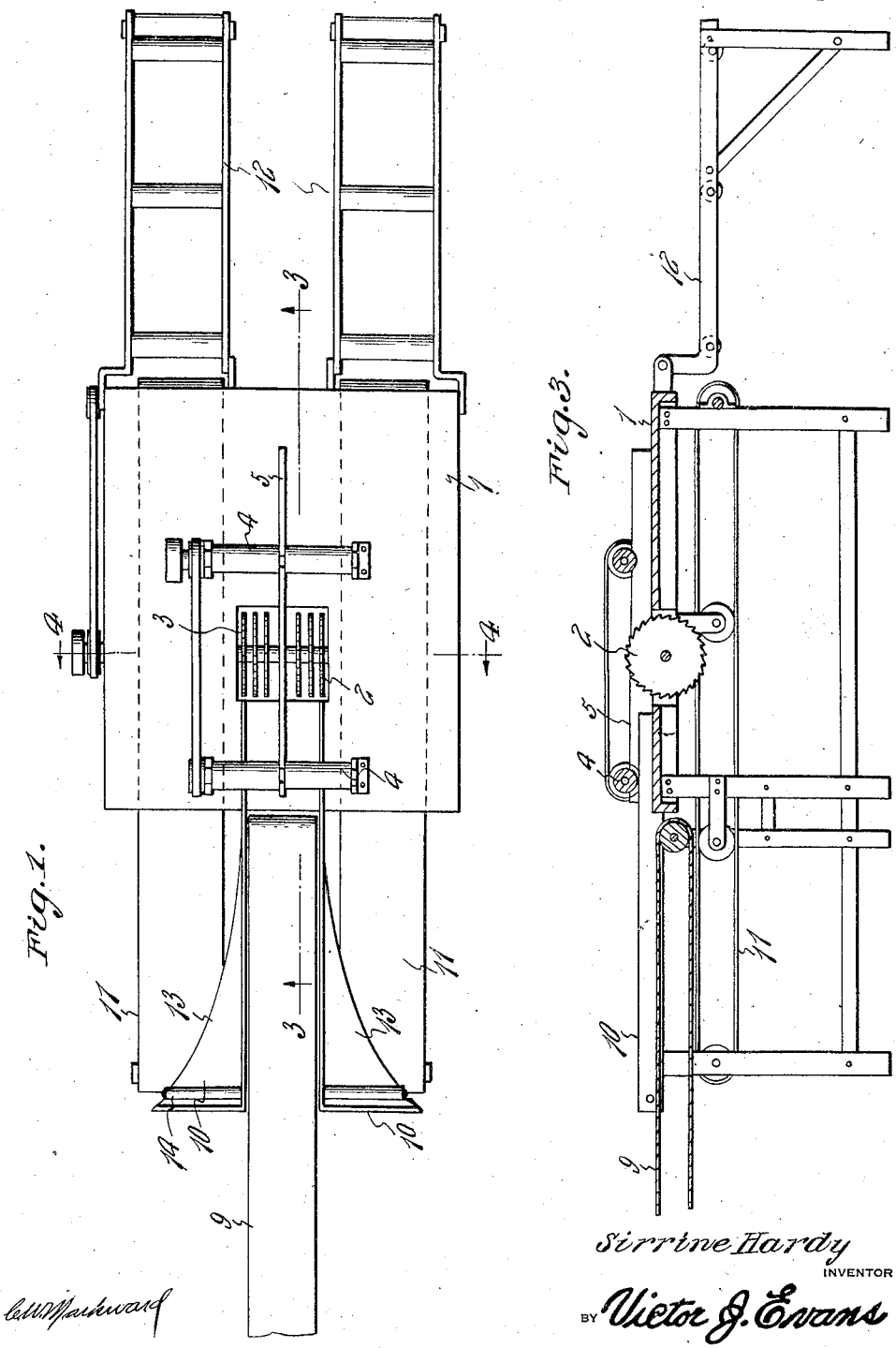

Jan. 11, 1927.
S. HARDY
1,614,362
LATH CUTTING MACHINE
Filed Oct. 5, 1923
3 Sheets-Sheet 3
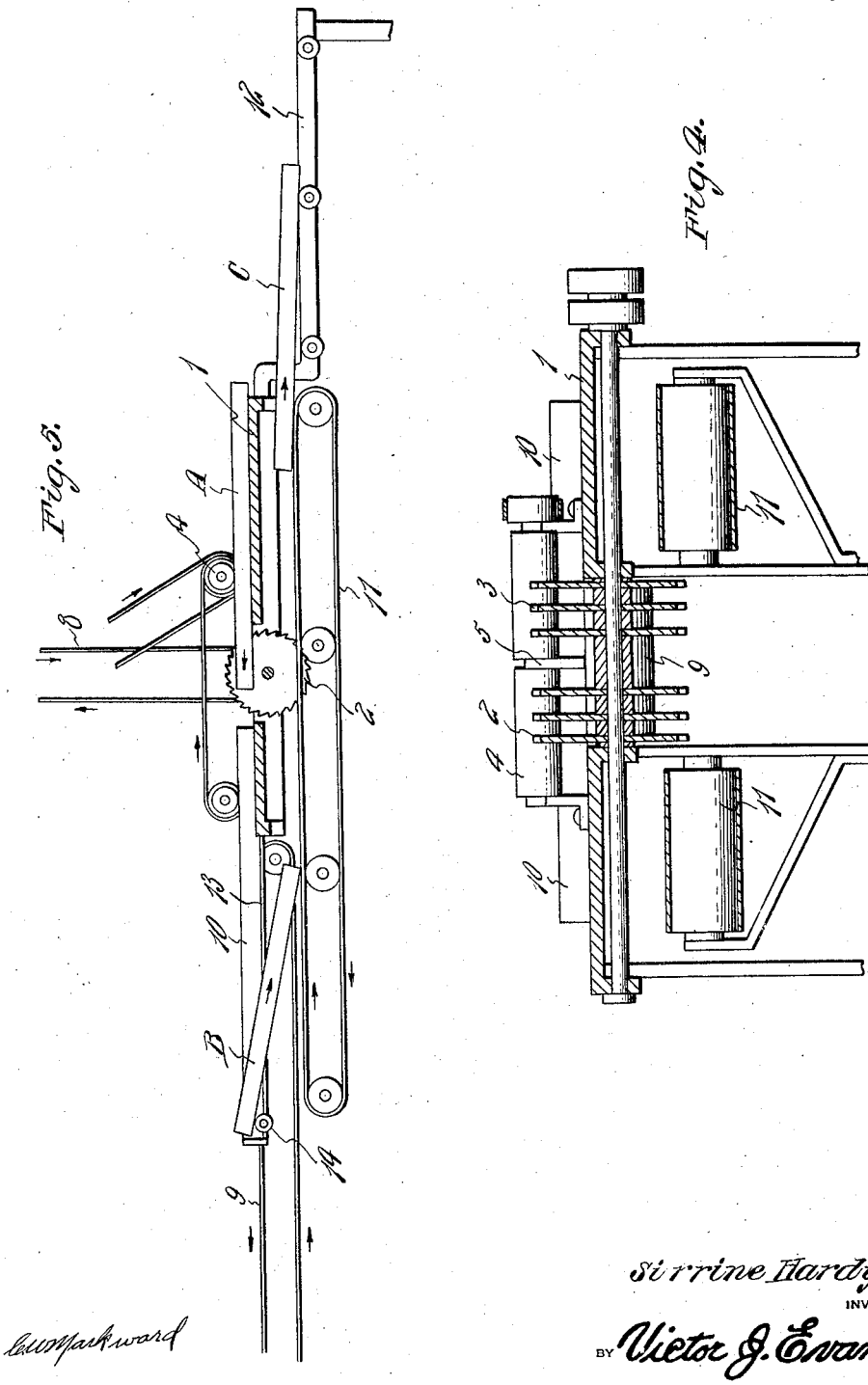

Patented Jan. 11, 1927.

1,614,362

UNITED STATES PATENT OFFICE.

SIRRINE HARDY, OF SAVANNAH, GEORGIA.

LATH-CUTTING MACHINE.

Application filed October 5, 1923. Serial No. 666,813.

This invention relates to a lath cutting machine, the general object of the invention being to so construct the machine that it can be operated by one man instead of a number of men as in the machines now in use.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts, throughout the several views, and in which:—

Figure 1 is a plan view of the device.

Figure 2 is an elevation thereof.

Figure 3 is a section on line 3—3 of Figure 1.

Figure 4 is a section on line 4—4 of Figure 1.

Figure 5 is a diagrammatic view showing the course of the timbers.

Figure 6 is a detail view of one of the separator blades.

In these views, 1 indicates a table which supports the two sets of saws, 2 and 3, each set containing three saws, the feed rollers 4 and the gage 5. These parts are the same as in machines as now constructed. The saws and feed rollers are driven from a drive shaft 6 through the pulleys 7 and belts 8. A conveyor 9 receives the laths cut by the saws and conveys them to a distant point. The timbers from which laths are cut are directed outwardly by the separator blades 10 which have their inner ends in line with the outer saws of the sets and these blades cause the timbers to drop upon the conveyor belts 11 which convey the timbers under the table and upon the racks 12 at the front end of the table so that the timbers can be picked up by the operator and passed through the saws again. The separator blades are provided with the flanges 13 and with the rollers 14 for causing the timbers to drop upon the conveyors 11. The horizontal flange 13 of each blade supports the forward end of the timber, while its rear end is resting upon the table. Then the front end of the beam strikes the roller 14 and rides up the same just as the rear end drops from the table. The curved outer edge of flange 13 then causes the beam to fall upon the belt 11 which carries it rearwardly under the table.

It will be noted that if a piece of timber therein after the laths have been cut therefrom, be comparatively narrow; the inner end of the same will have a tendency to drop down between the vertical portion of the inner side wall of the member 10 and the conveyor 11, spaces being left between these members as shown in the plan view of Figure 1; however the timber regardless of its width when being directed on the horizontal part 13 will have its inner end ride over the roller 14 and when the inner end drops from the inner end of the table 1 it will cause the table to strike the curved edge of the horizontal part 13 and direct the inner end of the timber onto the belt 11 and it will be noted that if the timber be a comparatively narrow one it will strike the curved edge at a point adjacent the vertical edge of the separator and guide the member laterally onto the belt 11.

If the inner edge of the horizontal part 13 was cut straight across instead of curved and a narrow member remained after the laths had been cut therefrom there would be no means for guiding the inner ends of the belt 11 and prevent the same from dropping down to the inner side of the belt 11 whereas by providing the curved part as shown and described it will guide the remaining timber onto the belt 11. In the case of a wide timber being passed onto the separator 10, it will be noted that the inner edge of this table will strike the curved edge of the horizontal part 13 adjacent its narrowest point and the timber will be prevented from tilting by means of the roller 14 upon which the outer end of the timber will rest and the timber will be prevented from sliding off the belt laterally through the medium of its weight and width because as soon as the inner end of the timber leaves the table 1 it will drop downward quickly onto the belt 11 and even though the outer end of the timber may be guided slightly laterally toward the outer edge of the belt it will be impossible for the curved portion to guide the timber entirely off the belt.

From the above it will be seen that one man can operate the device as he can place the timbers under the feed rollers so that they will pass through the saws. The laths will pass upon the conveyor 9 while the separators will cause the timbers to drop upon the conveyors 11 and be returned to the front end of the machine where they can be again placed under the feed rollers by the operator.

The diagrammatic view shows the course of the timbers through the machine. The letter A indicates a timber just starting through the saws. Letter B shows the timber after it has passed through the saws and is dropping upon the conveyor 11. The letter C shows the timber as being placed upon the rack 12 by the conveyor. The racks can be so constucted that they can be folded over on top of the table when not in use.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a lath cutting machine, a separator member arranged in front of the saw thereof for separating the cut portions of a timber from the timber, a conveyor for returning the timber from the rear of the machine to the front thereof and a horizontal part on the outer end of the separator member upon which the outer end of the timber rests and having a curved outer edge diagonal to the conveyor which leaves the rear end of the timber unsupported and causes it to slide for directing the timber upon the conveyor.

2. In a lath cutting machine, a separator member arranged in front of the saw thereof for separating the cut portions of a timber from the timber, a conveyor for returning the timber from the rear of the machine to the front thereof, a horizontal part on the outer end of the separator member upon which the outer end of the timber rests and having a curved outer edge diagonal to the conveyor which leaves the rear end of the timber unsupported and causes it to slide for directing the timber upon the conveyor, and a roller on the outer end of the horizontal part over which the forward end of the timber will ride just before it drops upon the conveyor.

In testimony whereof I affix my signature.

SIRRINE HARDY.